Figure 6:
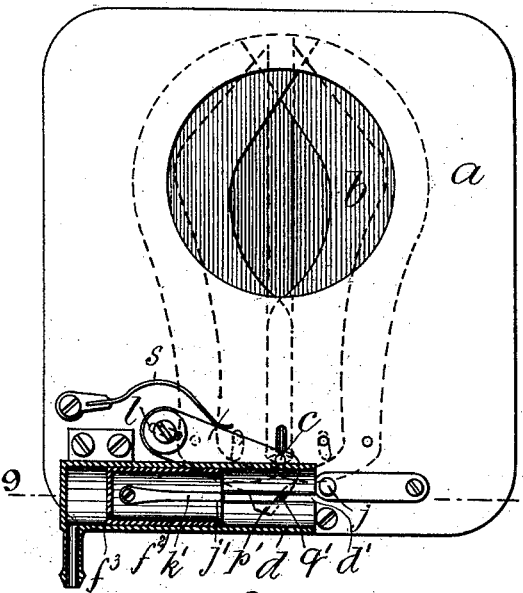

(No Model.) 3 Sheets—Sheet 1.
J. W. GRANTLAND.
CAMERA SHUTTER.
No. 487,833. Patented Dec. 13, 1892.
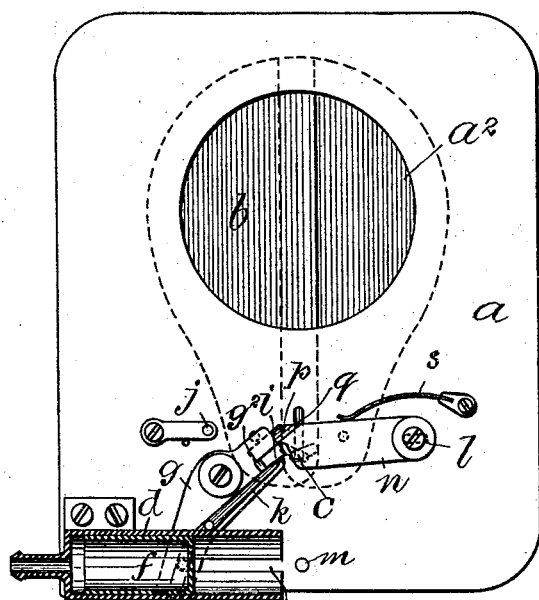
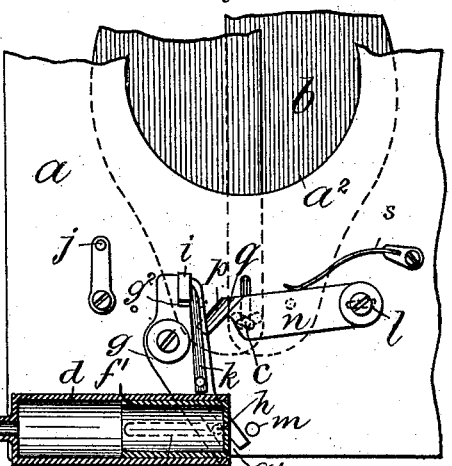
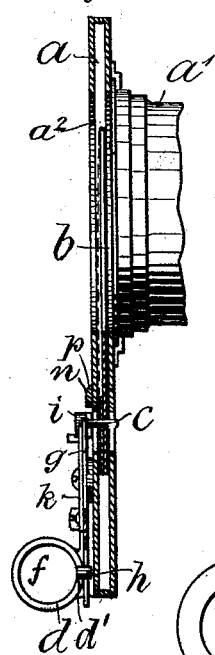
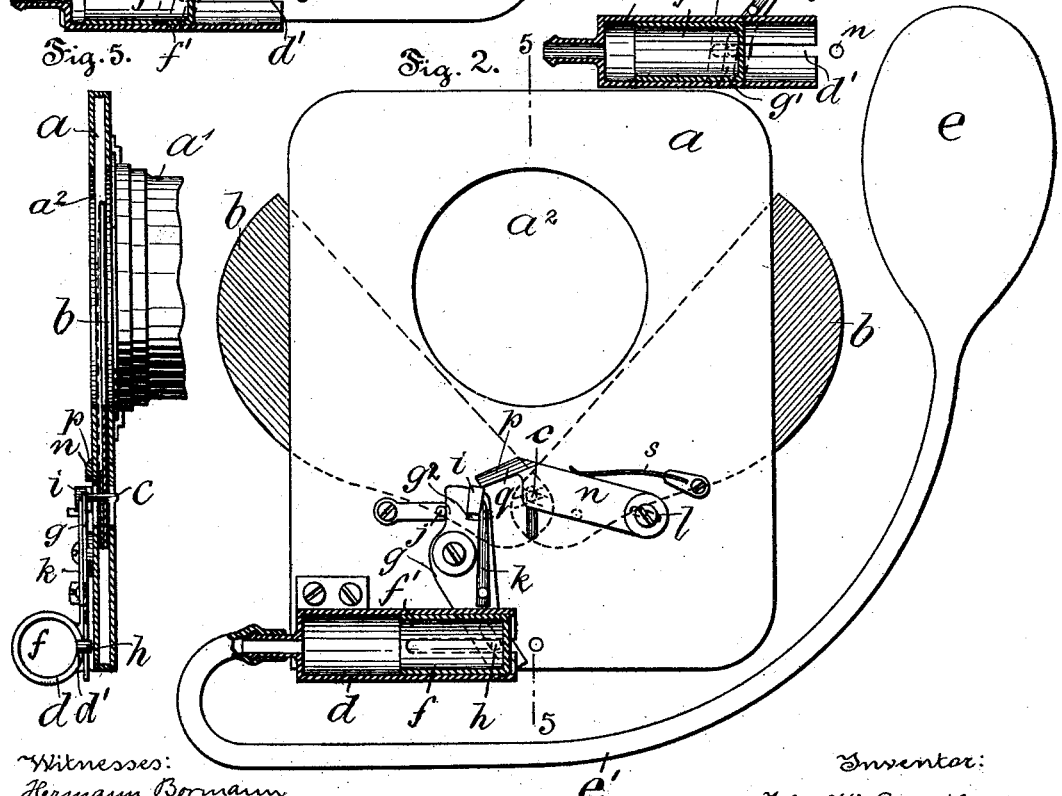
Witnesses:
Hermann Bornmann
Thomas M. Smith
Inventor:
John W. Grantland
by J. Walter Douglass
Att'y.

(No Model.) 3 Sheets—Sheet 2.

J. W. GRANTLAND.
CAMERA SHUTTER.

No. 487,833. Patented Dec. 13, 1892.

Witnesses:
Hermann Bormann
Thomas M. Smith

Inventor:
John W. Grantland
by J. Walter Douglass
Att'y.

(No Model.) 3 Sheets—Sheet 3.

J. W. GRANTLAND.
CAMERA SHUTTER.

No. 487,833. Patented Dec. 13, 1892.

Witnesses:
Hermann Bormann
Thomas M. Smith.

Inventor:
John W. Grantland.
by J. Walter Douglass
Att'y.

UNITED STATES PATENT OFFICE.

JOHN W. GRANTLAND, OF PHILADELPHIA, PENNSYLVANIA.

CAMERA-SHUTTER.

SPECIFICATION forming part of Letters Patent No. 487,833, dated December 13, 1892.

Application filed December 17, 1891. Serial No. 415,336. (No model.)

*To all whom it may concern:*

Be it known that I, JOHN W. GRANTLAND, a citizen of the United States, residing at the city of Philadelphia, in the county of Philadelphia and State of Pennsylvania, have invented certain new and useful Improvements in Photographic Shutters, of which the following is a specification.

My invention has relation, in general, to photographic shutters having wings for opening and closing the lens-tube of a camera to effect an exposure of a sensitized plate; and it relates more particularly to the construction, arrangement, and mode of operation of the component parts of the pneumatic apparatus for actuating the wings thereof.

The principal objects of my present invention are, first, to provide a compact, reliable, and comparatively-inexpensive photographic shutter for effecting either time or instantaneous exposures of a sensitized film; second, to provide pneumatic apparatus for positively opening the normally-closed wings of the photographic shutter either to effect an instantaneous or a time exposure of the plates or films, and, third, to arrange the component parts of the pneumatic apparatus for operation in such manner that the same are automatically and positively returned to normal position for effecting another opening of the wings after the completion of each instantaneous exposure.

My invention consists of a photographic shutter comprising a series of normally-closed wings provided with slots, a pin working in said slots to open the wings, a trigger reciprocated by the piston and adapted to yield transversely of the direction of travel thereof, and a lever adapted to shift said pin and provided with a working edge for effecting an instantaneous exposure during the intermediate portion of the forward stroke of the piston and with an inclined or beveled edge for shifting said trigger during the intermediate portion of the return stroke of the piston.

My invention further consists of a photographic shutter comprising a series of normally-closed wings provided with slots, a pin working in said slots to open the wings, a trigger reciprocated by the piston and adapted to yield transversely of the direction of travel thereof, a lever adapted to shift said pin and provided with a working edge for effecting an instantaneous exposure during the intermediate portion of the forward stroke of the piston and with an inclined or beveled edge for shifting said trigger during the intermediate portion of the return stroke of the piston, and a stop for checking the forward stroke of the piston to prevent the disengagement of the trigger and lever.

My invention further consists in the improvements in pneumatic photographic shutters hereinafter described and claimed.

The nature and characteristic features of my invention will be more fully understood from the following description, taken in connection with the accompanying drawings, forming part hereof, and in which—

Figure 7:
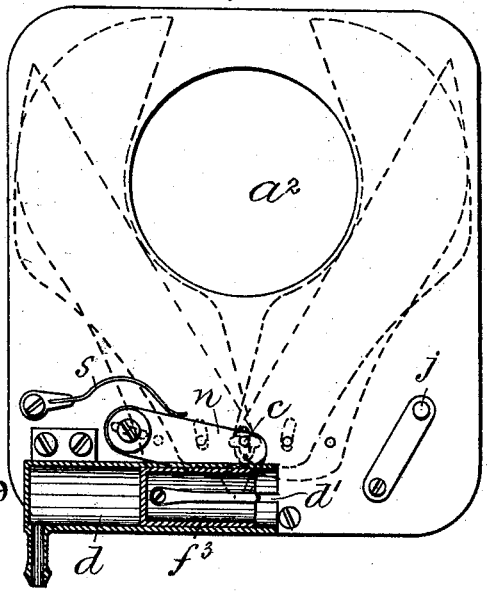
Figure 8:
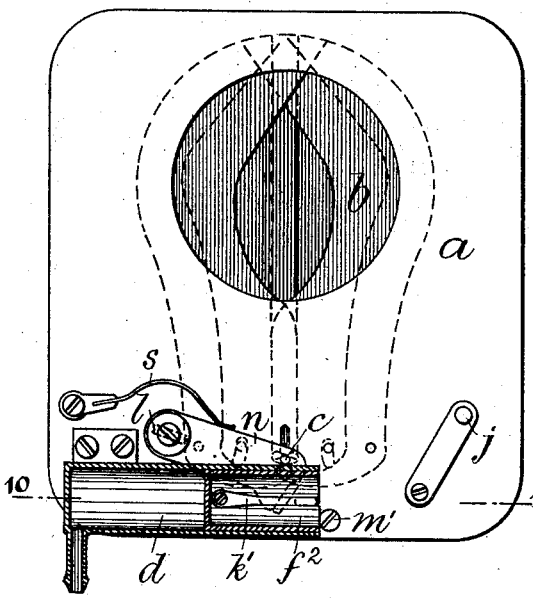
Figure 9:
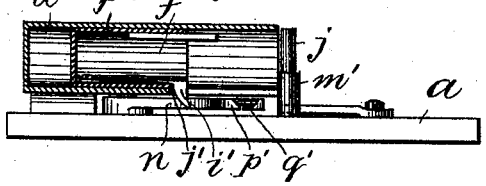
Figure 10:
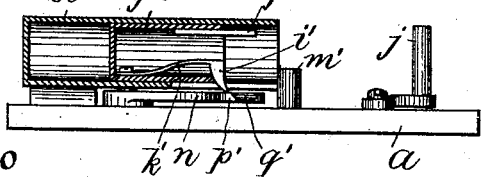
Figure 11:
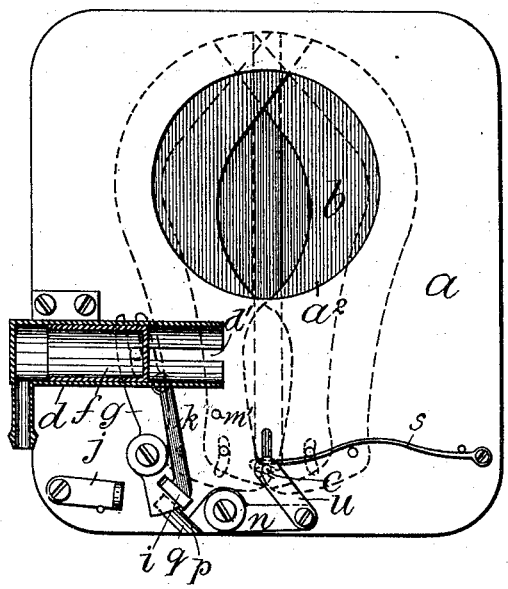
Figure 12:
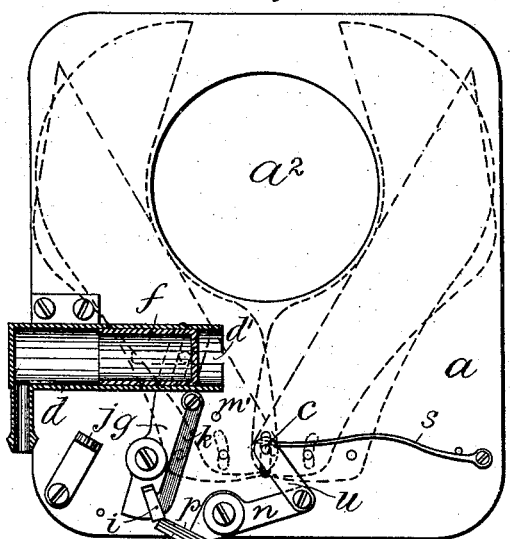

Figure 1 is a front elevation of a photographic shutter embodying features of my invention, showing the wings thereof in closed position, and also showing the trigger in position for actuating the wing-operating lever during the forward stroke of the piston and the hand-knob in position for checking such motion of the piston in order to effect a time exposure. Fig. 2 is a similar view showing the normally-closed wings retained in open position by reason of the fact that the forward stroke of the piston is checked by the stop, thus causing the trigger to maintain the wing-operating lever in elevated position. Fig. 3 is a similar view showing the stop arranged for permitting the piston to accomplish its full stroke in order to effect an instantaneous exposure, and also showing the manner in which the trigger passes out of range of or trips the wing-operating lever, in order to permit the same to return to its normal position under the influence of a spring. Fig. 4 is a detail view of the pneumatic apparatus and its accessories illustrated in Fig. 1, showing the same arranged for effecting an instantaneous exposure, and illustrating the manner in which the trigger yields and passes in rear of the wing-operating lever after the same has been permitted to return to its normal position and during the return stroke of the piston. Fig. 5 is a transverse section on the line 5 5 of Fig. 2, illustrating a convenient mode of applying my improved photographic shutter to a camera. Fig. 6 is a front view of a photographic shutter, showing the pneumatic cylinder in section, in order to illustrate a modification of my invention, in which the trigger is connected directly with the piston, instead of with a pivotal trigger-lever operated by and connected with the piston, and also showing the stop in position for checking the stroke of the piston and the trigger in position for operating the wing-actuating lever. Fig. 7 is a view similar to Fig. 6, showing the trigger about to pass out of range of or trip the wing-operating lever during the full forward stroke of the piston, in order to permit the wing-operating lever to return to normal position under the influence of a spring. Fig. 8 is a view of the device illustrated in Figs. 6 and 7, showing the position of the trigger and wing-operating lever at the commencement of the return stroke of the piston and after the wing-operating lever has been permitted to return to normal position. Fig. 9 is a transverse section on the line 9 9 of Fig. 6, showing the trigger in position for actuating the wing-operating lever. Fig. 10 is a transverse section on the line 10 10 of Fig 8, showing the position of the trigger after it has yielded and while it is passing the wing-operating lever during the return stroke. Fig. 11 is a front view of a photographic shutter embodying a second modification of my invention, which differs very slightly from the device illustrated in Figs. 1, 2, 3, 4, and 5, showing a link interposed between the wing-operating lever and pin that engages the wings, and also illustrating the position of the parts when the wings are closed; and Fig. 12 is a view of the device illustrated in Fig. 11, showing the trigger about to pass out of range of or trip the wing-operating lever during the forward stroke of the piston.

In the drawings, $a$ is a main frame or hollow housing adapted to be applied to the end of a camera-tube in such manner that it ranges transversely thereof, as shown in Fig. 5. This housing $a$ is provided with a central aperture $a^2$, corresponding in size with the bore of the camera-tube $a'$ and located in alignment therewith.

$b$ are wings located within the housing $a$ and pivotally connected therewith by means of pins ranging transversely of the interior of the housing and engaging suitable openings or pivot-holes in the respective wings.

$c$ is a pin ranging transversely of the housing and projecting beyond the face of the same. This pin $c$ works up and down in straight slits formed in the face and rear walls of the housing and engages curved slots in the respective wings $b$. The movement of the pin $c$ in an upward direction through the straight slits of the housing and the curved slots of the wings causes the latter to be turned about their respective pivotal supports into position for opening the aperture $a^2$. The movement of the pin $c$ in a downward direction through the straight slits of the housing and curved slots of the wings $b$ causes the latter to be turned about their respective points of pivotal support into position for closing the aperture $a^2$.

$d$ is a pneumatic cylinder which supplies power for shifting the pin $c$ in an upward direction, in order to effect the opening of the aperture $a^2$. The closing of this aperture is effected by a spring S, which is hereinafter described, and which tends to push the pin $c$ normally downward.

$e$ is a compressible bulb communicating with the interior of the cylinder $d$ by means of the tube $e'$ and adapted when compressed by the hand of the operator to supply compressed air to the cylinder.

Having thus briefly indicated certain of the parts of one of the many well-known types of photographic shutters to which my invention is applicable, I will not proceed to describe, first, the construction and afterward the mode of operation of the mechanism which embodies my present invention, and which is interposed between the piston of the cylinder $d$ and pin $c$ for effecting and controlling the opening and closing of the wings $b$.

Referring now to the drawings, and more particularly to Figs. 1, 2, 3, 4, and 5 thereof, $f$ is a piston adapted to work in the cylinder $d$ and elongated, as at $f'$, in order to cover a slot $d'$, cut or otherwise formed in the side wall of the cylinder, so as to prevent the escape of air.

$g$ is a trigger-lever pivotally connected with the housing $a$ and having one extremity provided with a slot $g'$, adapted to engage the pin $h$, connected with the piston $f$ and working in the slot $d'$. The other extremity of this lever $g$ is provided with a transversely-ranging slot $g^2$.

$i$ is a trigger working in the slot $g^2$ and afforded a range of movement transversely of the lever $g$. This trigger $i$ is connected with the shank of the lever $g$ by a spring $k$, that serves to hold the trigger $i$ normally in such position that its rear edge projects into alignment with the rear face of the lever $g$, as shown in Fig. 5. This spring $k$ also permits the trigger $i$ to be shifted transversely of the lever $g$ in such manner that its rear edge may pass over the surface of the front face of the lever $g$, for a purpose to be hereinafter fully described. It may be remarked that the trigger $i$ is reciprocated in the arc of a circle by the movements of the piston and through the instrumentality of the trigger-lever $g$ and pin $h$.

$j$ is a hand-knob pivotally connected with the front of the housing $a$ and adapted to be shifted into the path of movement of the trigger-lever $g$, thus serving as a stop and preventing it from completing its full range of movement. Inasmuch as the lever $g$ and piston $f$ are connected together by means of the pin $h$, as has been hereinabove described, it follows that the hand-knob $j$, by contacting with the lever $g$, serves to prevent the piston $f$ from completing its full stroke.

$m$ is a stop connected with the housing $a$ and interposed in the path of motion of the piston $f$ for preventing the escape of the piston $f$ from the open extremity of the cylinder $d$ when the hand-knob $j$ is turned out of range of the lever $g$. Thus the piston $f$ in completing its full stroke is checked by the stop $m$, and the piston $f$ may be prevented from completing its full stroke by means of the hand-knob $j$, that acts upon it through the instrumentality of the trigger-lever $g$.

$n$ is a wing-operating lever rigidly connected with the pin $c$ and movably connected with the front wall of the housing $a$ by means of the slotted connection $l$, so that when the lever $n$ is turned upward it causes the pin $c$ to traverse the straight slots in the housing $a$ and the curved slots in the wings $b$, with the result that the latter are opened.

S is a spring connected with the front wall of the housing $a$ and adapted to engage and depress the lever $n$, so that the wings $b$ are normally in closed position.

$p$ is a finger projecting from the lever $n$, behind the lever $g$, and into range of the trigger $i$, so that during the first portion of the forward stroke of the piston $f$ the trigger-lever $g$ is shifted and the trigger $i$ engages the finger $p$, and thus causes the lever $n$ and pin $c$ to be shifted upward, with the result that the wings $b$ are opened. During the completion of the forward stroke of the piston $f$ the trigger $i$ passes out of range of and releases the finger $p$, or, in other words, trips the lever $n$, which, being thus released, is automatically returned to its normal position by the spring S, with the result that the wings $b$ are closed. During the return stroke of the piston $f$ the trigger $i$ must be returned to its normal position in rear of the finger $p$. This result is attained by providing the finger $p$ with a beveled edge $q$, that by engaging the trigger $i$ shifts the same transversely of the lever $g$ against the force of the spring $k$ and to one side of the lever $n$, so that the levers $g$ and $n$ pass each other and the trigger $i$ drops into its normal position in rear of the finger $p$.

The mode of operation of the above-described device in effecting a time exposure—that is, in opening the aperture $a^2$, maintaining the same in open position for any required length of time, and then closing the aperture—is as follows: The hand-knob $j$ is shifted into position for limiting the range of motion of the piston $f$, as shown in Figs. 1 and 2, and the piston $f$ is impelled forward into contact with the hand-knob $j$ by compressing the hand-bulb $e$. This forward motion of the piston $f$ causes the lever $g$ to be shifted, with the result that the trigger $i$ traverses the arc of a circle. During this movement the trigger $i$ engages the finger $p$, and thus shifts the lever $n$ and pin $c$ upward, with the result that the wings $b$ are opened, as shown in Fig. 2. The wings may be held in open position during the required interval of time by maintaining the bulb in a compressed state or condition, thus causing the compressed air in rear of the piston to maintain the latter in contact with the hand-knob $j$. Upon completion of the required exposure the hand-bulb $e$ is released and the pin $c$ and lever $n$ are force downward by the resiliency of the spring S, so that the wings $b$ are closed. In order to effect an instantaneous exposure, the hand-knob $j$ is shifted out of range of the lever $g$, Fig. 3, in order to permit the piston to accomplish its full stroke. When the hand-bulb is compressed, the piston $f$ is impelled forward into contact with the stop $m$, and thus completes its full stroke. During the first part of the forward stroke of the piston the trigger $i$ engages the finger $p$, thus lifting the lever $n$ and opening the wings $b$. However, as the piston advances toward the completion of its stroke the trigger $i$ passes out of range of or disengages the finger $p$, or, in other words, trips the lever $n$, whereupon the latter is rapidly returned to its normal depressed position by the spring S, as shown in Fig. 3, with the result that the wings $b$ are returned to their closed position. During the return stroke of the piston the trigger $i$ rides on the beveled edge $q$ of the finger $p$, Fig. 4, and then drops behind the latter into position for effecting another operation of the wings $b$.

From the foregoing description of the device illustrated in Figs. 1 to 5, inclusive, it appears that one of the most important features of my invention comprises a spring-controlled pivotal lever for operating the pin that actuates the wings and a trigger reciprocated by the piston and adapted during the forward stroke of the piston to engage and operate and disengage said lever to permit of its automatic return to normal position, and said trigger also adapted during the return stroke of the piston to yield without operating the lever. I have devised several devices in which the above-mentioned feature is present, but in some of which the relative positions of the piston, wing-operating lever, and trigger are varied without affecting their mode of operation.

In the modification of my invention illustrated in Figs. 6, 7, 8, 9, and 10 the trigger-lever $g$ and its actuating-pin $h$, Figs. 1 to 5, inclusive, are dispensed with, and the trigger $i'$ is carried by the piston and works in a slot $j'$, formed in the forwardly-projecting portion $f^2$ thereof. This trigger $i'$ is connected with the projecting portion $f^2$ of the piston $f^3$ by means of the spring $k'$. The spring $k'$ normally causes the trigger $i'$ to project beyond the flange $f^2$ into position for engaging the rear edge of the finger $p'$ of the wing-operating lever $n$ during the forward stroke of the piston $f^3$. The spring $k'$ also by yielding permits the trigger $i'$ to ride over the beveled edge $q'$, past the finger $p'$, and into its normal position during the return stroke of the piston. In this instance the hand-knob $j$ may be shifted into position for engaging the forwardly-projecting portion $f^2$ of the piston $f^3$, in order to prevent the same from completing its full forward stroke.

In effecting a time-exposure the hand-knob $j$ is shifted into position for limiting the range of motion of the piston, as shown in Fig. 6, and the piston is impelled forward by compressing the hand-bulb. During this forward motion of this piston $f^3$ the trigger $i'$ engages the finger $p'$, as shown in Figs. 6 and 9, and thus shifts the wing-operating lever $n$ and pin $c$ upward, with the result that the wings $b$ are opened. The wings $b$ may be held in open position during the required interval of time by maintaining the bulb in a compressed state or condition, thus causing the compressed air in rear of the piston to maintain the latter in contact with the hand-knob $j$. Upon the completion of the required exposure the hand-bulb $e$ is released and the wings $b$, pins $c$, and lever $n$ are automatically returned to their normal position by the resiliency of the spring S.

In order to effect an instantaneous exposure, the hand-knob $j$ is shifted out of range of the piston, as shown in Fig. 7, so that the piston may complete its full forward stroke. When the hand-bulb is compressed, the piston $f^3$ is impelled forward and completes its full stroke. During the first part of the forward stroke of the piston the trigger $i'$ engages the finger $p'$ and shifts it, together with the pin $c$, upward, as shown in Fig. 7, with the result that the wings $b$ are opened. However, as the piston advances toward the completion of its forward stroke the trigger $i'$ passes out of range of and releases the finger $p'$, as shown in Fig. 8, whereupon the lever $n$ is forced downward by the spring S, with the result that the wings $b$ are closed. During the return stroke of the piston the knife-edge $q'$ engages the trigger $i'$ and shifts it against the force of the spring $k'$ and to one side of the wing-operating lever $n$, Fig. 10, and thus permits of the positive return of the trigger $i'$ to its normal position in rear of the finger $p'$ without in anywise effecting the position of the wings $b$.

The construction of the modification of my invention illustrated in Figs. 11 and 12 is identical with the construction illustrated in Figs. 1 to 5, inclusive, with the following exceptions: The wing-operating lever $n$ is connected with the pin $c$ by a link $u$ and the levers $n$ and $g$ are located below instead of above the cylinder, and it may be remarked in this connection that preference is given to the arrangement or disposition of the levers $n$ and $g$ as shown in Figs. 1 to 5, inclusive, because it affords more room or space adjacent to the aperture $a^2$.

Having thus described the nature and objects of my invention, what I claim as new, and desire to secure by Letters Patent, is —

1. A photographic shutter comprising a series of normally-closed wings provided with slots, a pin working in said slots to open the wings, a trigger reciprocated by the piston and adapted to yield transversely of the direction of travel thereof, and a lever adapted to shift said pin and provided with a working edge for effecting an instantaneous exposure during the intermediate portion of the forward stroke of the piston and with an inclined or beveled edge for shifting said trigger during the intermediate portion of the return stroke of the piston, substantially as and for the purposes set forth.

2. A photographic shutter comprising a series of normally-closed wings provided with slots, a pin working in said slots to open the wings, a trigger reciprocated by the piston and adapted to yield transversely of the direction of travel thereof, a lever adapted to shift said pin and provided with a working edge for effecting an instantaneous exposure during the intermediate portion of the forward stroke of the piston and with an inclined or beveled edge for shifting said trigger during the intermediate portion of the return stroke of the piston, and a stop for checking the forward stroke of the piston to prevent the disengagement of the trigger and lever, substantially as and for the purposes set forth.

3. A photographic shutter comprising a pneumatic cylinder and its complemental piston, a series of normally-closed wings, a pin for operating said wings, a trigger-lever reciprocated by said piston, a spring-controlled trigger afforded a range of motion transversely of said trigger-lever, and a wing-operating lever provided with a finger and adapted to actuate said pin, substantially as and for the purposes set forth.

4. A photographic shutter comprising a pneumatic cylinder and its complemental piston, a series of normally-closed wings, a pin for operating said wings, a trigger-lever provided with a slot and reciprocated by said piston, a trigger afforded a range of play in said slot, a spring connected with said trigger-lever and trigger, and a wing-operating lever adapted to actuate said pin and provided with a finger having a beveled edge, substantially as and for the purposes set forth.

5. A photographic shutter comprising a pneumatic cylinder and its complemental piston, a series of normally-closed wings, a pin for operating said wings, a pivotal trigger-lever connected with said piston by a suitable connection, a trigger connected with the trigger-lever by a spring, and a wing-operating lever supported by a slotted connection and provided with a finger having a beveled edge, substantially as and for the purposes set forth.

In witness whereof I have hereunto set my signature in the presence of two subscribing witnesses.

JOHN W. GRANTLAND.

Witnesses:
A. B. STOUGHTON,
THOMAS M. SMITH.